US011235818B2

United States Patent
Walkemeyer et al.

(10) Patent No.: US 11,235,818 B2
(45) Date of Patent: Feb. 1, 2022

(54) UNIVERSAL ANCHOR POINTS FOR MOBILE ROBOTS

(71) Applicant: A9.com, Inc., Palo Alto, CA (US)

(72) Inventors: Phillip Walkemeyer, Boulder, CO (US); Daniel Sekich, Loveland, CO (US); Jacob Blacksberg, Boulder, CO (US); Jonathan Mcqueen, Boulder, CO (US)

(73) Assignee: A9.com, Palo Alto, CA (US)

( * ) Notice: Subject to any disclaimer, the term of this patent is extended or adjusted under 35 U.S.C. 154(b) by 231 days.

(21) Appl. No.: 16/427,007

(22) Filed: May 30, 2019

(65) Prior Publication Data
US 2019/0367099 A1    Dec. 5, 2019

Related U.S. Application Data

(60) Provisional application No. 62/678,552, filed on May 31, 2018.

(51) Int. Cl.
| | | |
|---|---|---|
| B62D 33/02 | (2006.01) | |
| B60L 50/60 | (2019.01) | |
| G05D 1/00 | (2006.01) | |
| B25J 5/00 | (2006.01) | |

(52) U.S. Cl.
CPC .......... *B62D 33/0207* (2013.01); *B60L 50/66* (2019.02); *B25J 5/007* (2013.01); *B60L 2200/40* (2013.01); *G05D 1/0088* (2013.01)

(58) Field of Classification Search
CPC . B62D 33/0207; B60L 50/66; B60L 2200/40; B25J 5/007; G05D 1/0088
See application file for complete search history.

(56) References Cited

U.S. PATENT DOCUMENTS

| | | | | |
|---|---|---|---|---|
| 9,656,806 B2 * | 5/2017 | Brazeau | ................... | B25J 5/007 |
| 9,827,677 B1 * | 11/2017 | Gilbertson | ........... | B25J 15/0014 |
| 9,878,448 B2 * | 1/2018 | Kang | ..................... | B25J 9/0057 |
| 9,878,587 B1 * | 1/2018 | Zevenbergen | ........ | F16C 19/548 |
| 10,137,566 B2 * | 11/2018 | Bastian, II | ................ | B66F 9/07 |

* cited by examiner

*Primary Examiner* — Bryan A Evans
(74) *Attorney, Agent, or Firm* — Eversheds Sutherland (US) LLP

(57) ABSTRACT

Systems, methods, and computer-readable media are disclosed for universal anchor points for mobile robots. In one embodiment, an example mobile robot may include a chassis, a removable assembly comprising a support member, and a first anchor point coupled to the chassis. The first anchor point may be configured to anchor the support member to the chassis. The first anchor point may be configured to be coupled to support members of different diameters or widths.

20 Claims, 11 Drawing Sheets

UNIVERSAL ANCHOR POINTS FOR MOBILE ROBOTS

CROSS-REFERENCE TO RELATED APPLICATION

This application claims the benefit of U.S. Provisional Application No. 62/678,552, filed May 31, 2018, which is incorporated by reference in its entirety.

BACKGROUND

Robots may be used to assist humans with various tasks. For example, certain types of robots may be used to pick up or transport items, whereas other types of robots may be used to pack and ship items. Some robots may be configured to drive or otherwise move autonomously or semi-autonomously. In order to perform different functions, different structures or parts may be attached to robots. For instance, shelves may be attached to robots in one example, and a robotic arm may be attached to robots in another example. However, switching between different types of attachments or robot configurations may be time consuming or difficult.

Figure 1:
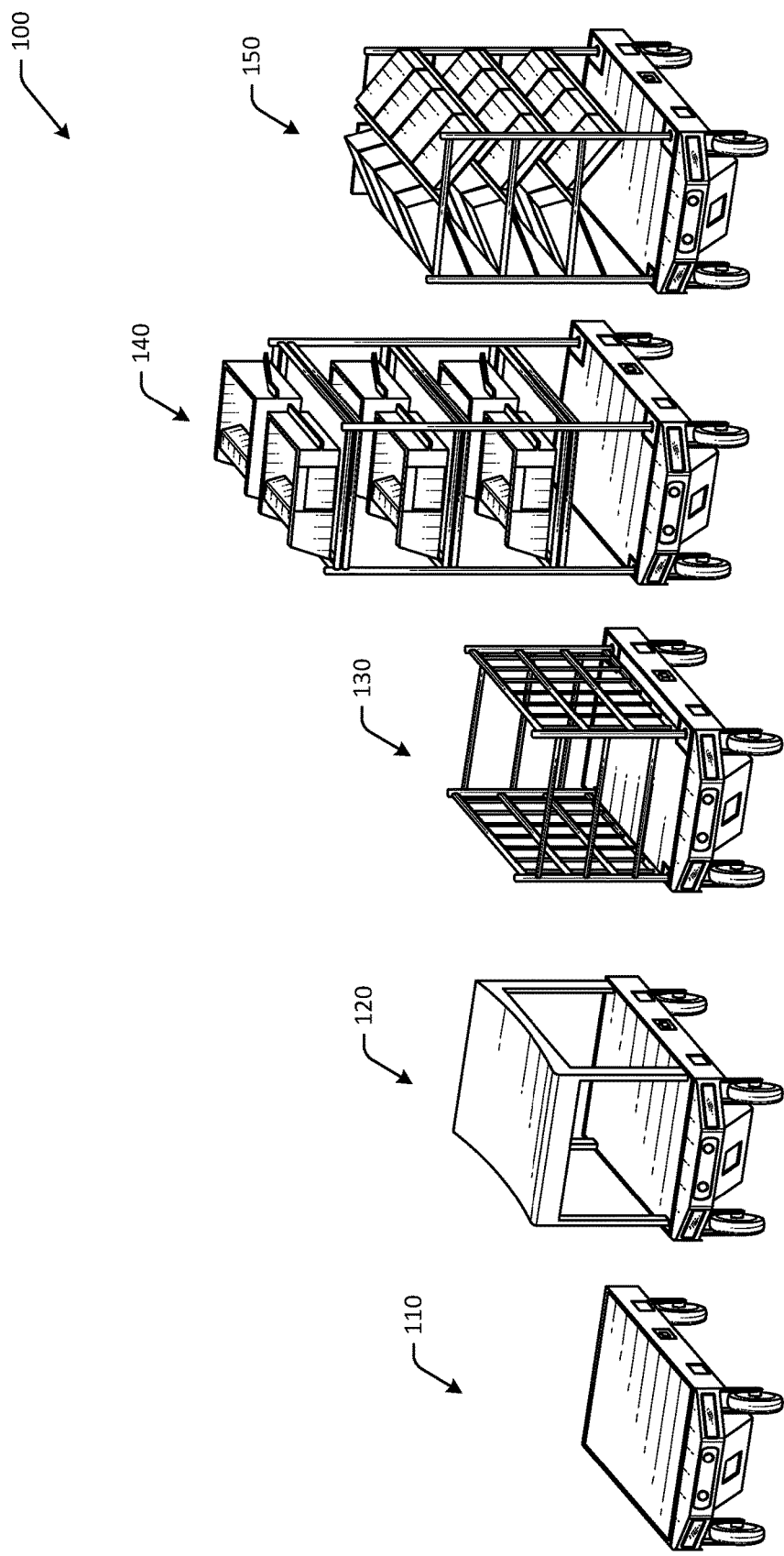
FIG. 1 is a schematic illustration of example use cases for universal anchor points for mobile robots in accordance with one or more embodiments of the disclosure.

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. The use of the same reference numerals indicates similar, but not necessarily the same or identical components. Different reference numerals may be used to identify similar components. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Overview

Robots may be used in various facilities, such as fulfillment centers and other facilities. Certain robots may be autonomous or semi-autonomous. For example, some robots may be configured to automatically move from a first location to a second location without manual operation or direction. Some robots may be fitted with attachments or other components depending on desired functionality. For example, a mobile robot may be equipped with a cart, container, shelving, or other components that may be used to transport items or products. In a particular example, a mobile robot may have a flat surface on which one or more shelves may be mounted. Items may be placed on the shelves, and the mobile robot may autonomously deliver the items, or move the items, from one location to another. In another example, a container or sidewalls may be mounted on the mobile robot, and certain items, such as round balls or other difficult to secure items may be transported by the mobile robot. As a result, the mobile robots may assist in the transport of equipment (e.g., robotic arms, cranes, lighting indicators, etc.) an/or items, thereby reducing manual effort and increasing efficiency and safety.

To perform different functions, different types of attachments or configurations may be used with mobile robots. For example, different types of supports may be used for different types of shelving and/or sidewalls for containers that may be coupled to a mobile robot. Examples of different supports include circular supports, rectangular supports, and so forth, as well as supports of different dimensions (e.g., different widths, different diameters, etc.). The different types and/or dimensions of supports and other attachments may need different mechanisms to be attached to the mobile robot. For example, different thread types, different hole locations, and so forth. Accordingly, removal and/or placement of supports and/or other attachments or components to mobile robots may be time consuming because specific mechanisms or plates may need to be used for different types of attachments or components.

Embodiments of the disclosure include universal anchor points for autonomous robots. Some embodiments include anchor plates that include various features, such as hole patterns, thread types, cord openings, and/or other features that allow for any type of support or attachment to be coupled to a mobile robot without having to remove the universal anchor plate. As a result, swapping between different supports or attachments may be less time consuming and require reduced manual effort, as the mechanism to couple the support or attachment to the robot may not need to be changed when changing an attachment or configuration of a mobile robot.

Referring to FIG. 1, example use cases 100 for universal anchor points for mobile robots are depicted in accordance with one or more embodiments of the disclosure. Although discussed in the context of certain examples of autonomous cart functionality, other embodiments may be directed to any suitable use case where items may be transported.

FIG. 1 illustrates example mobile robot configurations with different types of supports and/or attachments. For example, a first mobile robot 110 may be a mobile robot with a flat upper surface on which various items can be positioned for transport. A second mobile robot 120 may be a mobile robot with four rectangular vertical supports and a table top surface coupled to the supports, so as to form a cart configuration. A third mobile robot 130 may be a mobile robot with four circular vertical supports and sidewalls coupled to the supports, so as to form a container configuration. A fourth mobile robot 140 may be a mobile robot with four circular vertical supports and flat shelving coupled to various points along the supports, thereby forming a first shelving configuration. A fifth mobile robot 150 may be a mobile robot with four circular vertical supports and angled shelving coupled to various points along the supports, thereby forming a second shelving configuration. Other configurations of the mobile robot may be included, along with different attachment types.

The various examples illustrated in FIG. 1 may include universal anchor points, as described herein, that may allow for the same mobile robot to be reconfigured into any of the illustrated configurations while using the same universal anchor point(s). As a result, modification of functionality of the mobile robot may not be time consuming and may efficiency may be increased.

Example embodiments of the disclosure provide a number of technical features or technical effects. For example, in accordance with example embodiments of the disclosure, certain embodiments of the disclosure may improve reconfiguration time and/or efficiency of fulfillment centers. The above examples of technical features and/or technical effects of example embodiments of the disclosure are merely illustrative and not exhaustive.

One or more illustrative embodiments of the disclosure have been described above. The above-described embodiments are merely illustrative of the scope of this disclosure and are not intended to be limiting in any way. Accordingly, variations, modifications, and equivalents of the embodiments disclosed herein are also within the scope of this disclosure. The above-described embodiments and additional and/or alternative embodiments of the disclosure will be described in detail hereinafter through reference to the accompanying drawings.

ILLUSTRATIVE EMBODIMENTS AND USE CASES

Figure 2:
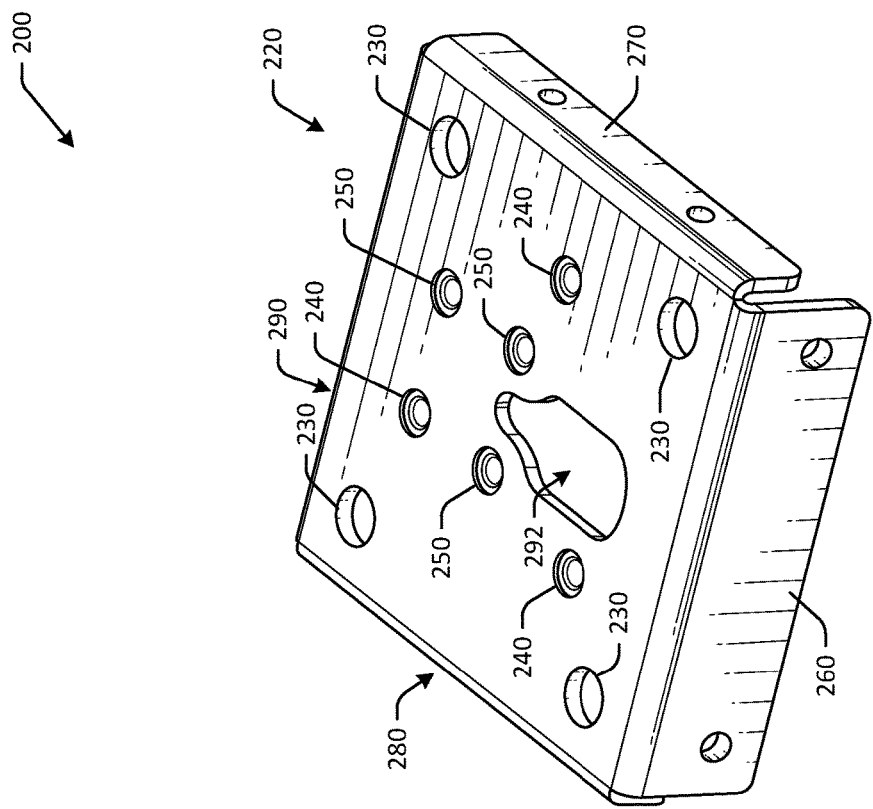
FIG. 2 is a schematic illustration of an example universal anchor point for mobile robots in accordance with one or more embodiments of the disclosure.
Figure 2:
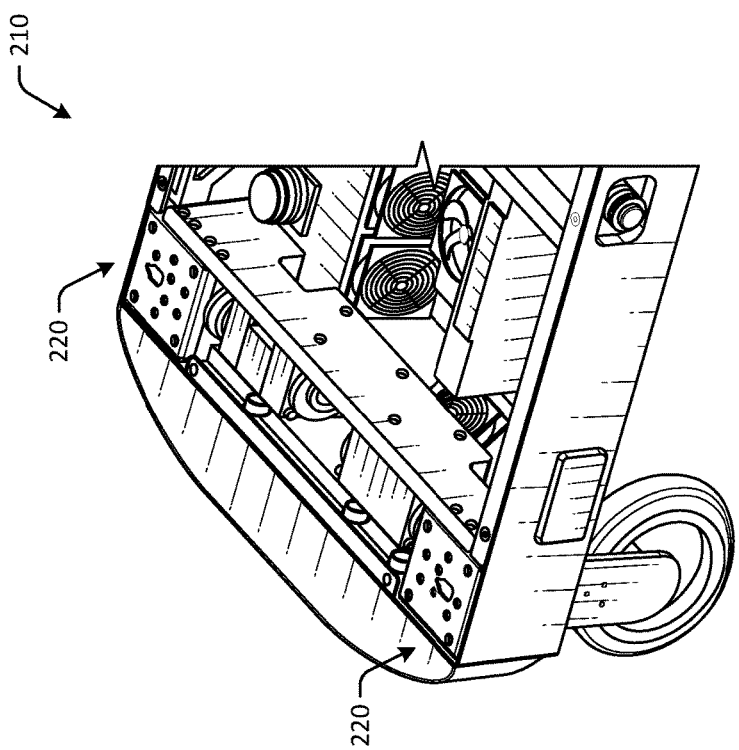

FIG. 2 is a schematic illustration of an example universal anchor point for mobile robots in accordance with one or more embodiments of the disclosure. Other embodiments may include 200 additional or fewer components. The illustration of FIG. 2 may not be to scale, and may not be illustrated to scale with respect to other figures. The universal anchor point illustrated in FIG. 2 may be the same universal anchor point discussed with respect to FIG. 1.

In FIG. 2, a mobile robot 210 may include one or more universal anchor plates 220. The universal anchor plates 220 may be disposed or positioned at or near one or more corners of a chassis of the mobile robot 210. In some embodiments, in addition to, or instead of, positioning at corners of the mobile robot 210, the universal anchor plates 220 may be disposed along one or more side surfaces of the chassis, such as between two corners of the chassis of the mobile robot 210.

The universal anchor plate 220 may be a sheet metal attachment plate that enables multiple (user configurable) shelf assemblies to be easily attached (or removed) from one or more corners of the mobile robot 210. In some embodiments, the mobile robot 210 may include a lid or cover with cutouts that expose the universal anchor plates 220, or that cover the universal anchor plates 220. In the illustrated example, the lid is not illustrated.

The universal anchor plate 220 is illustrated in isolation in FIG. 2. The universal anchor plate 220 may include one or more through holes or openings. The through holes or openings may be used to attach anchors of various supports or cart/shelving configurations to the universal anchor plate 220 and/or mobile robot 210. For example, the universal anchor plate 220 may include one or more corner through holes 230 that may be disposed at or near corners of the universal anchor plate 220. In the illustrated example, the universal anchor plate 220 includes four corner through holes 230. The corner through holes 230 may have a first diameter. Each of the corner through holes 230 may have the same diameter. The corner through holes 230 may be used to couple rectangular supports to the universal anchor plate 220 in some embodiments.

The universal anchor plate 220 may include one or more triangular pattern through holes 240 that may be disposed at or near a center or middle portion of the universal anchor plate 220. In the illustrated example, the universal anchor plate 220 includes three triangular pattern through holes 240. The triangular pattern through holes 240 may have a second diameter. The second diameter may be less than the first diameter. Each of the triangular pattern through holes 240 may have the same diameter. The triangular pattern through holes 240 may be used to couple circular or triangular supports to the universal anchor plate 220 in some embodiments. For example, a circular support may have a flange with holes that form a triangle pattern, and the triangular pattern through holes 240 may be used to secure the circular support to the universal anchor plate 220. In some embodiments, a swage nut or other coupling device may be disposed on a lower surface of the universal anchor plate 220 ("upper," "lower," and "side" are used herein to describe relative positioning and not absolute positioning) on an opposite side of the triangular pattern through holes 240. The swage nut or other coupling device may be used to secure screws, bolts, or other fasteners. The swage nut may be pressed into the universal anchor plate 220 in some embodiments, or may be welded in other embodiments.

The universal anchor plate 220 may include one or more square pattern through holes 250 that may be disposed at or near a center or middle portion of the universal anchor plate 220. In the illustrated example, the universal anchor plate 220 includes three square pattern through holes 250. Together with one of the triangular pattern through holes 240, the square pattern through holes 250 may form a square pattern to which a square attachment type may be coupled to the universal anchor plate 220. The square pattern through holes 250 may have the second diameter or a different diameter. The second diameter may be less than the first diameter. Each of the square pattern through holes 250 may have the same diameter. In some embodiments, a swage nut or other coupling device may be disposed on a lower surface of the universal anchor plate 220 ("upper," "lower," and "side" are used herein to describe relative positioning and not absolute positioning) on an opposite side of the square pattern through holes 250. The swage nuts or other coupling device may be used to secure screws, bolts, or other fasteners.

The universal anchor plate 220 may include a cable pass through 292 that may be used for cables to pass from the chassis of the mobile robot 210 through the universal anchor plate 220 and up to a component coupled to the mobile robot 210. For example, a power cable may be passed through the cable pass through 292 to power lights or other equipment mounted to the mobile robot 210. The cable pass through 292 may include a portion of reduced width that may secure the cable after the cable is passed through the universal anchor plate 220.

The universal anchor plate 220 may include one or more flanges. The flanges may include holes or openings that may be used to couple the universal anchor plate 220 to the chassis of the mobile robot 210. For example, the universal anchor plate 220 may include a first flange 260, a second flange 270, a third flange 280, and a fourth flange 290. Some embodiments may only include one flange (such as the first flange 260), while other embodiments may not include any flanges, and may be coupled to the chassis using one of the through holes on the universal anchor plate 220.

The flanges may have different dimensions. For example, the first flange 260 may have a first height, the second flange 270 may have a second height, the third flange 280 may have a third height, and the fourth flange 290 may have a fourth height. The first height may be greater than the second height, third height, and fourth height. In other instances, the flanges may have the same heights. Some or all of the flanges may include openings or through holes to couple the universal anchor plate 220 to the chassis.

In some embodiments, the mobile robot 210 may be an autonomous cart that includes a chassis, a removable shelving assembly having a support member; and a first anchor plate, such as a universal anchor point or plate, coupled to the chassis, the first anchor plate configured to anchor the support member to the chassis. The first anchor plate may include a first set of holes forming a triangular pattern, the first set of holes having a first hole that is shared with a second set of holes that form a rectangular pattern. The hole may therefore be shared between the two configurations. In some embodiments, the removable shelving assembly can be removed from the chassis as an assembly, or without disassembling the removable shelving assembly.

In some embodiments, the mobile robot may include a chassis, a removable assembly that includes a support member, and a first anchor point coupled to the chassis, the first anchor point configured to anchor the support member to the chassis. The first anchor point may be a universal anchor plate that is configured to be coupled to support members of different diameters or widths. The removable assembly may be a shelving assembly (e.g., detachable shelf attachment, etc.), a conveyor belt assembly, or another type of assembly. The mobile robot may include a battery disposed in a cavity formed by the chassis, and a cable, such as a power cord, may extend from the battery through an aperture in the first anchor point.

Figure 3:
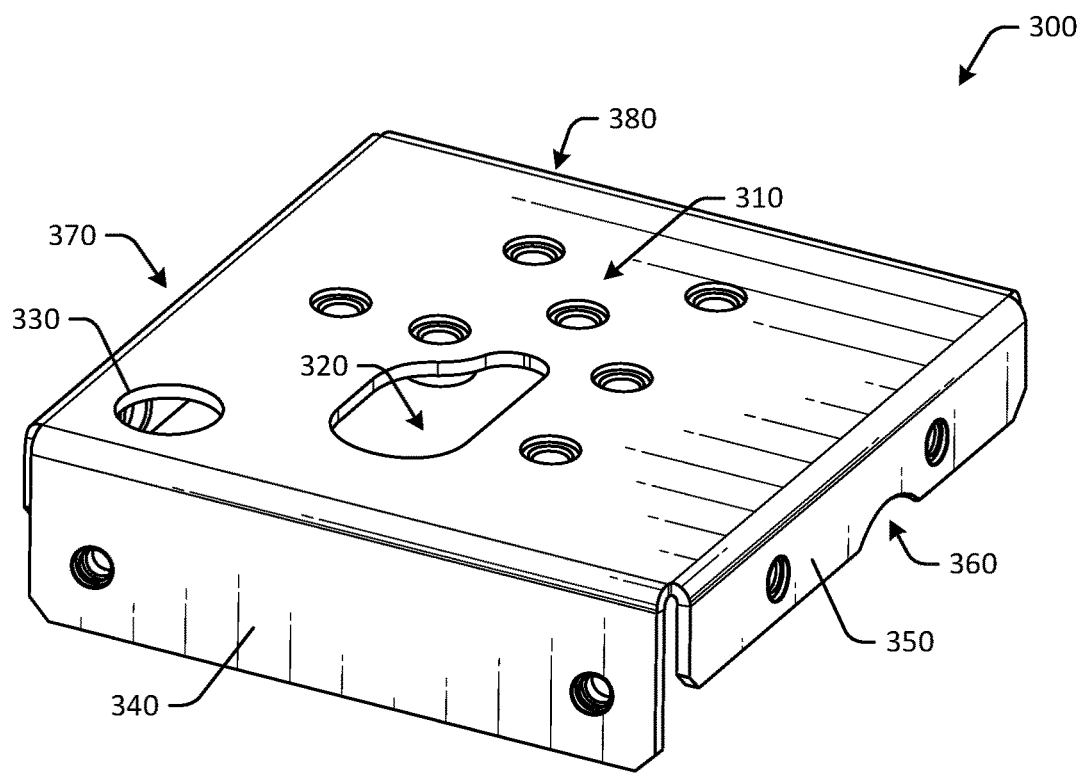
FIG. 3 is a schematic illustration of an example universal anchor plate for mobile robots in various perspective views in accordance with one or more embodiments of the disclosure.
Figure 3:
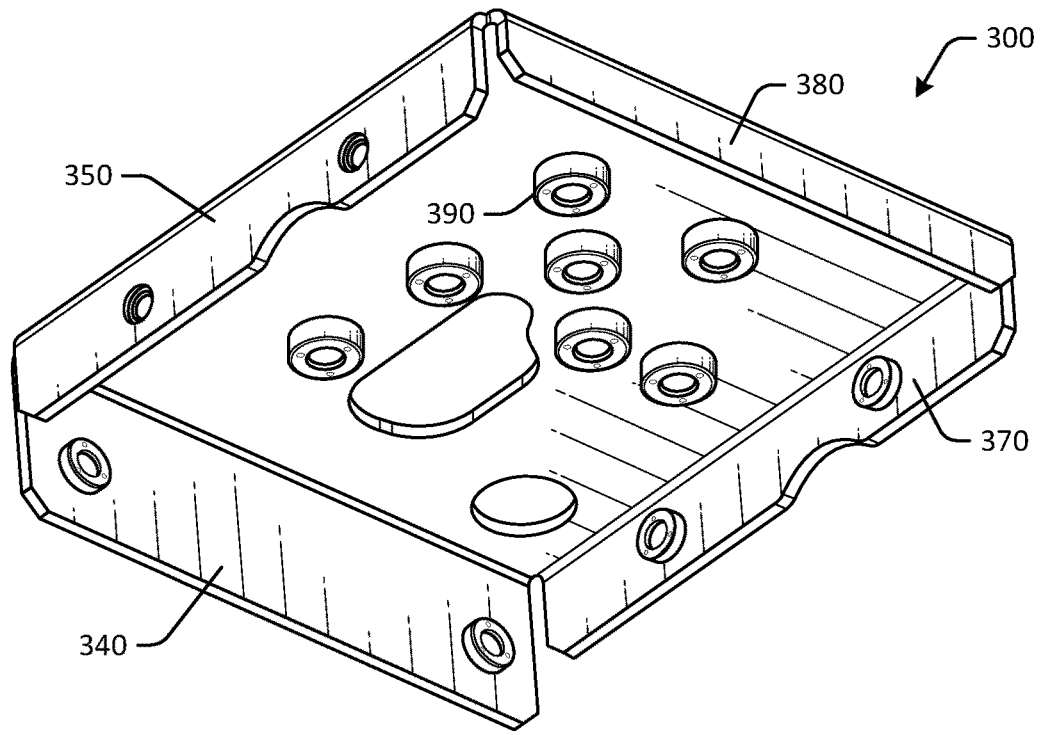

FIG. 3 is a schematic illustration of an example universal anchor plate 300 for mobile robots in various perspective views in accordance with one or more embodiments of the disclosure. Other embodiments may include additional or fewer components. The illustration of FIG. 3 may not be to scale, and may not be illustrated to scale with respect to other figures. The universal anchor plate illustrated in FIG. 3 may be the same universal anchor plate discussed with respect to FIG. 1.

The universal anchor plate 300 may be similar to the universal anchor plate 200 of FIG. 2. For example, the universal anchor plate 300 may have the same dimensions as the universal anchor plate 200 of FIG. 2. However, the universal anchor plate 300 may include different opening or through hole configurations.

For example, the universal anchor plate 300 may include through holes 310 that form a triangular pattern and a square pattern, but may also include an additional through hole disposed in a center of the square pattern through holes. The universal anchor plate 300 may also not include a single corner through hole 330, instead of the one or more corner through holes of FIG. 2. The single corner through hole 330 may be disposed adjacent to a first flange 340. The single corner through hole 330 may be used as a cable pass through in some configurations. The universal anchor plate 300 may include a cable pass through 320 through which cables can pass. However, the geometry of the cable pass through 320 may be different from that of FIG. 2. For example, the cable pass through 320 may include portions of different widths.

The flanges of the universal anchor plate 300 may be the same or different than the flanges of FIG. 2. For example, the universal anchor plate 300 may include the first flange 340, a second flange 350, a third flange 370, and a fourth flange 380. The second flange 350 may include a cutout portion 360 disposed along a center of a lower edge of the second flange 350. The third flange 370 may also include a cutout. However, the fourth flange 380 may not include a cutout in some embodiments. In addition, a height of the fourth flange 380 may be less than that of the second flange 350 and the third flange 370. The second flange 350 and the third flange 370 may have the same height, which may be less than a height of the first flange 340. The second flange 350, third flange 370, and/or fourth flange 380 may be optional. One or swage nuts 390 may be coupled to a lower surface of some or all of the openings in the universal anchor plate 300.

The universal anchor plate 300 is therefore configured for an electrical cable pass through, so that buttons or other items can be easily wired up on the shelving units coupled to a mobile robot. In some embodiments, the cable pass through 320 may be positioned so as to allow a cable to travel inconspicuously up through the center of a support or shelf leg. In addition, because the universal anchor plate 300 can be bolted through its bent flanges to a mobile robot's sturdy metal chassis, the universal anchor plate 300 may be strong and stiff, yet may not require much bulk material and is thus lightweight and simple to manufacture.

Additionally, because the universal anchor plate 300 is a small discrete component that is bolted in place, it is relatively simple to manufacture a completely custom anchor point, such as an anchor point with a unique hole pattern or cable pass thru that is in a custom location. Modification of one sheet metal part, such as the universal anchor plate 300, makes it possible for an autonomous cart to or mobile robot to accommodate a complete shelf system.

Figure 4:
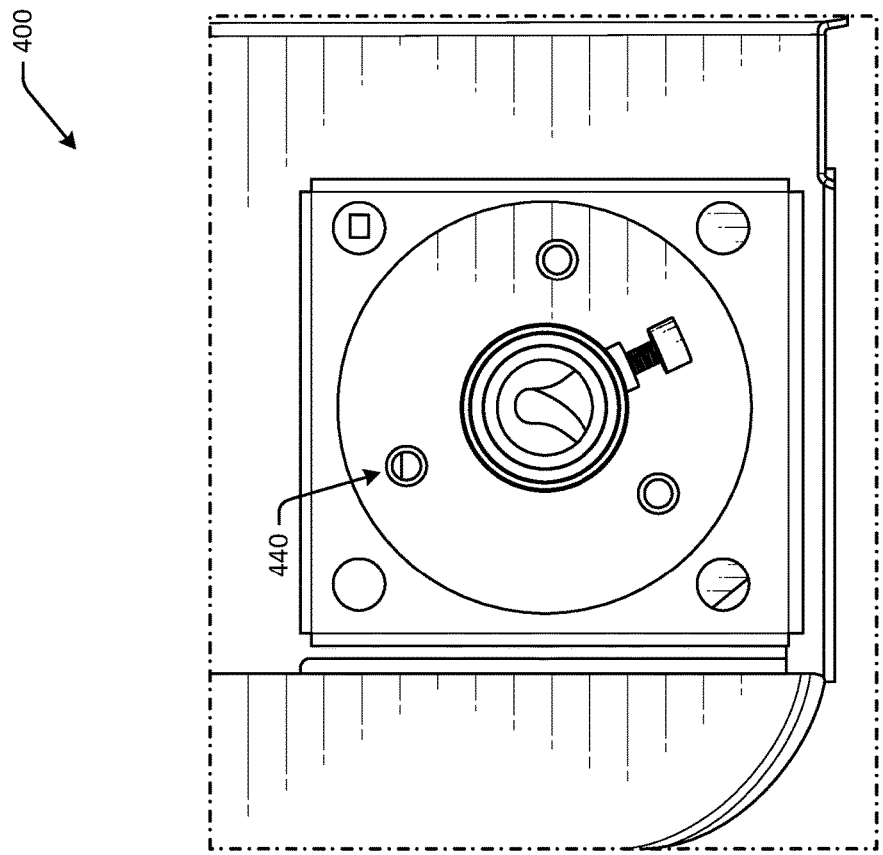
FIG. 4 is a schematic illustration of an example attachment configuration using a universal anchor point for mobile robots in accordance with one or more embodiments of the disclosure.
Figure 4:
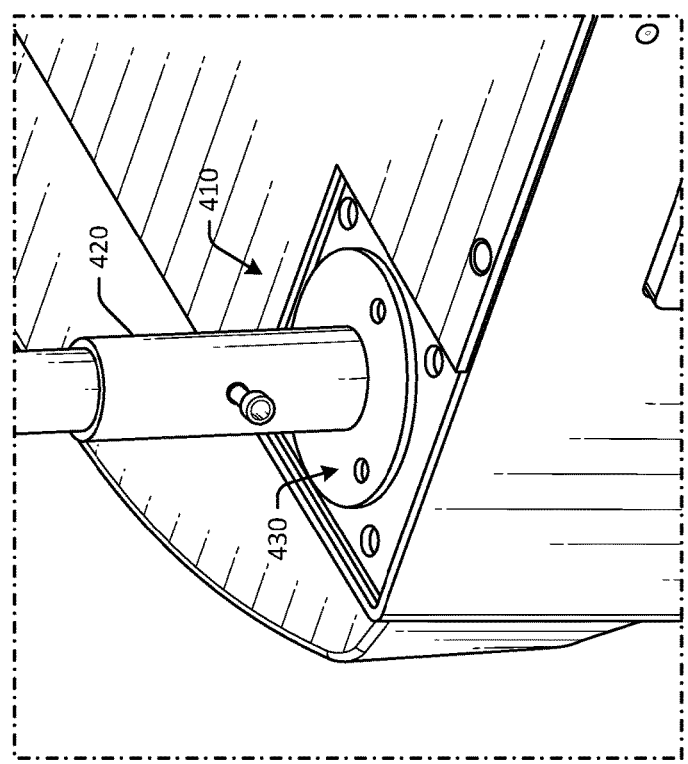

FIG. 4 is a schematic illustration of an example attachment configuration 400 using a universal anchor point 410 for mobile robots in accordance with one or more embodiments of the disclosure. Other embodiments may include additional, fewer, or different components. FIG. 4 illustrates a perspective view of the universal anchor point 410 used to couple a vertical support tube to a chassis of a mobile robot, as well as a top view of the corner of the mobile robot.

In FIG. 4, the universal anchor point 410 may be used to couple a tube having a one inch diameter to a mobile robot. For example, some users may use Creform tube systems to build shelving systems on mobile robots. The Creform tube systems may include circular vertical support tubes that are coupled to the universal anchor point 410. To couple the vertical support to the universal anchor point 410, a coupling portion 420 with a flange 430 may be used. The flange 430 may include a triangular hole pattern 440 that matches the triangular hole pattern on the universal anchor point 410. The flange 430 may therefore secure the coupling portion 420 to the universal anchor point 410 and the chassis of the mobile robot. The vertical support tube may be coupled to the coupling portion 420 and secured. The universal anchor point 410 may therefore be used to satisfy specific user requirements for shelving configurations. The universal anchor point 410 may provide for flexibility in how shelving is configured on a mobile cart, and may allow for users to create and assemble custom shelf configurations.

Figure 5:
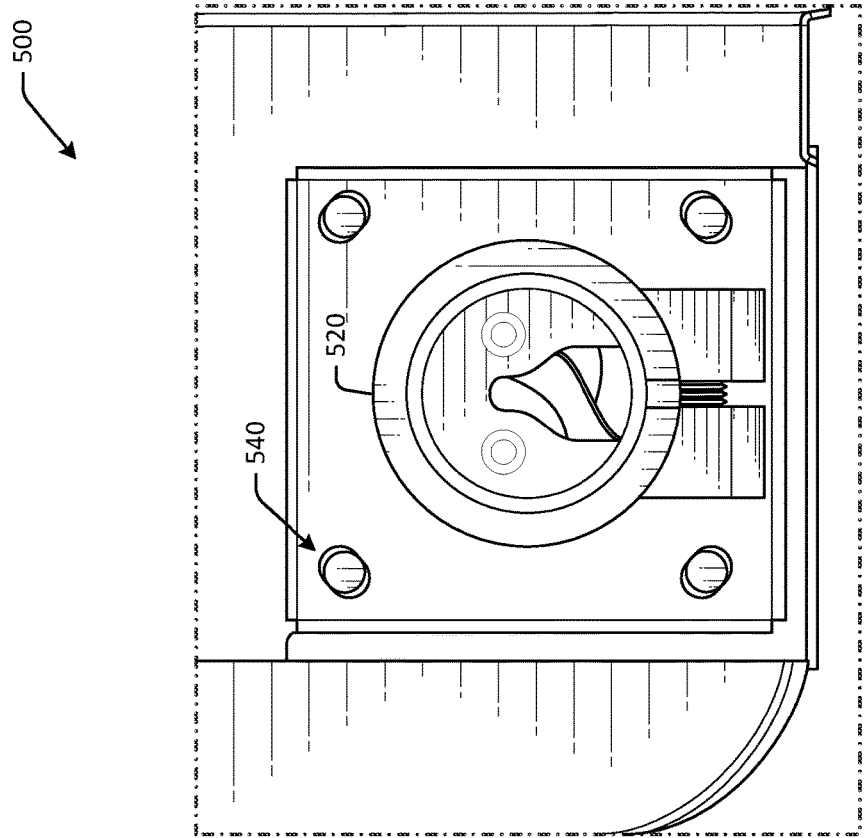
FIG. 5 is a schematic illustration of an example attachment configuration using a universal anchor point for mobile robots in accordance with one or more embodiments of the disclosure.
Figure 5:
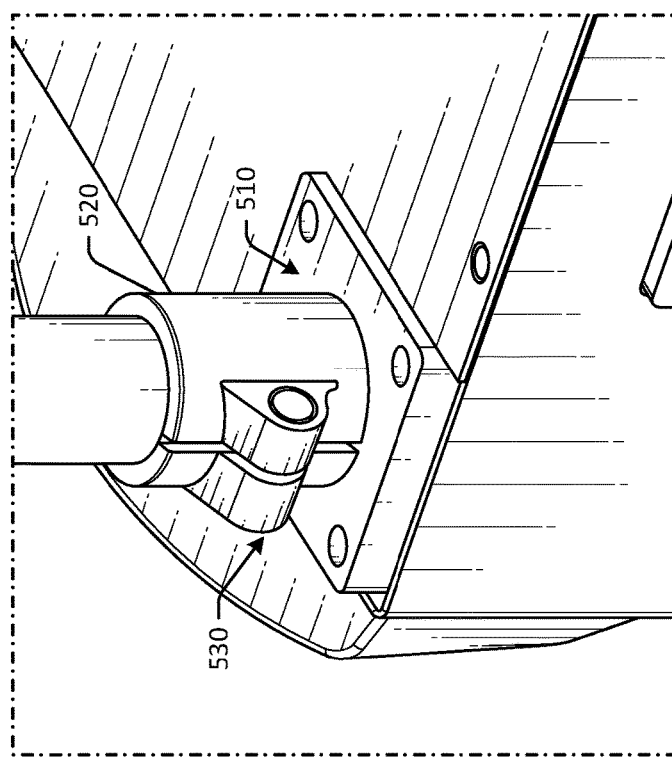

FIG. 5 is a schematic illustration of an example attachment configuration 500 using a universal anchor point 510 for mobile robots in accordance with one or more embodiments of the disclosure. Other embodiments may include additional, fewer, or different components. FIG. 5 illustrates a perspective view of the universal anchor point 510 used to couple a vertical support tube to a chassis of a mobile robot, as well as a top view of the corner of the mobile robot.

In FIG. 5, another embodiment of an attachment mechanism that can be accommodated by the universal anchor point 510 is illustrated. The universal anchor point 510 may be used to couple a tube having a two inch diameter to a mobile robot. For example, some users may use Creform tube systems to build shelving systems on mobile robots. The Creform tube systems may include circular vertical support tubes that are coupled to the universal anchor point 510. To couple the vertical support to the universal anchor point 510, a coupling portion 520 with a flange 530 may be used. The flange 530 may include a corner hole pattern 540 (or square hole pattern) that matches the corner or square hole pattern on the universal anchor point 510. The flange 530 may therefore secure the coupling portion 520 to the universal anchor point 510 and the chassis of the mobile robot. The vertical support tube may be coupled to the coupling portion 520 and secured. The universal anchor point 510 may therefore be used to satisfy specific user requirements for shelving configurations. The universal anchor point 510 may provide for flexibility in how shelving is configured on a mobile cart, and may allow for users to create and assemble custom shelf configurations.

Figure 6:
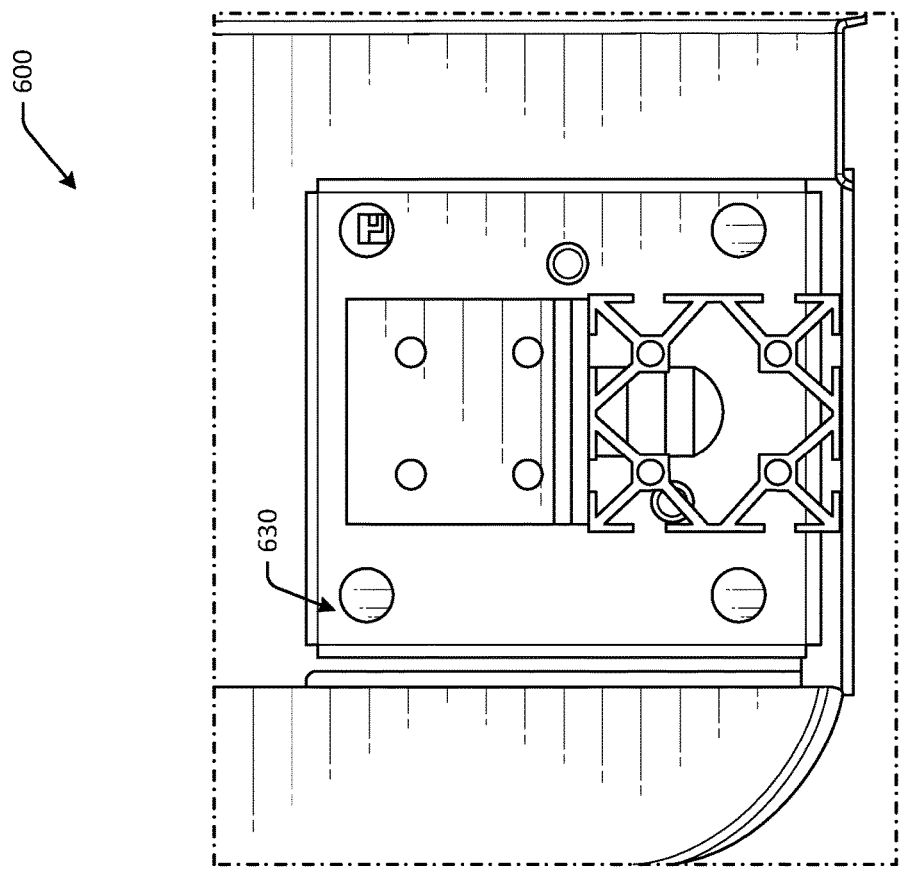
FIG. 6 is a schematic illustration of an example attachment configuration using a universal anchor point for mobile robots in accordance with one or more embodiments of the disclosure.
Figure 6:
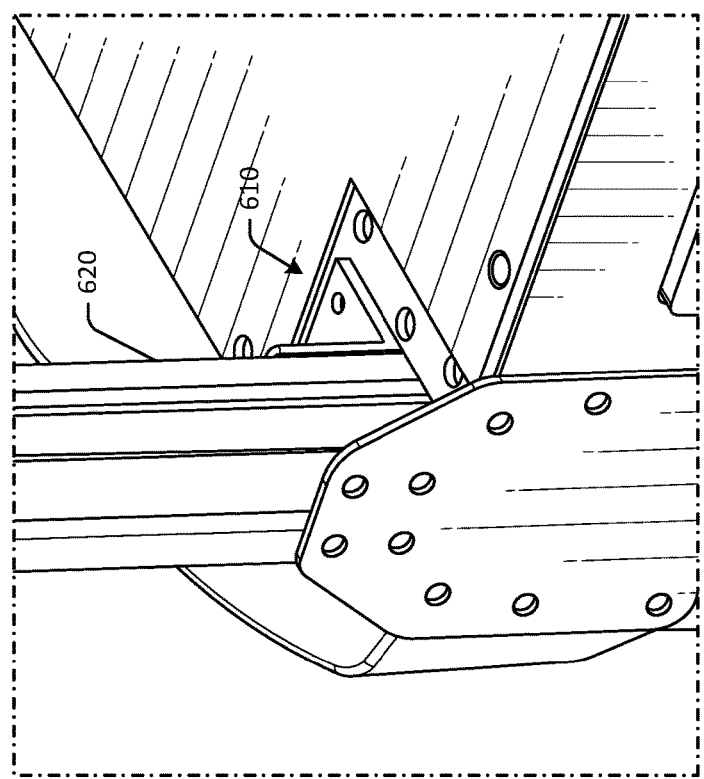

FIG. 6 is a schematic illustration of an example attachment configuration 600 using a universal anchor point 610 for mobile robots in accordance with one or more embodiments of the disclosure. Other embodiments may include additional, fewer, or different components. FIG. 6 illustrates a perspective view of the universal anchor point 610 used to couple a vertical support tube to a chassis of a mobile robot, as well as a top view of the corner of the mobile robot.

In FIG. 6, another embodiment of an attachment mechanism that can be accommodated by the universal anchor point 610 is illustrated. The universal anchor point 610 may be used to couple a rectangular support 620 having a two inch width to a mobile robot. For example, some users may use extruded aluminum (80/20) supports with different widths, such as two inch widths, to build shelving systems on mobile robots. The rectangular support(s) 620 may be coupled to the universal anchor point 610. To couple the rectangular support 620 to the universal anchor point 610, a coupling portion with a flange may be used. The flange may include a corner hole pattern 630 (or square hole pattern) that matches the corner or square hole pattern on the universal anchor point 610. The flange may therefore secure the coupling portion to the universal anchor point 610 and the chassis of the mobile robot. The rectangular support 620 may be coupled to the coupling portion and secured. The universal anchor point 610 may therefore be used to satisfy specific user requirements for shelving configurations. The universal anchor point 610 may provide for flexibility in how shelving is configured on a mobile cart, and may allow for users to create and assemble custom shelf configurations.

Figure 7:
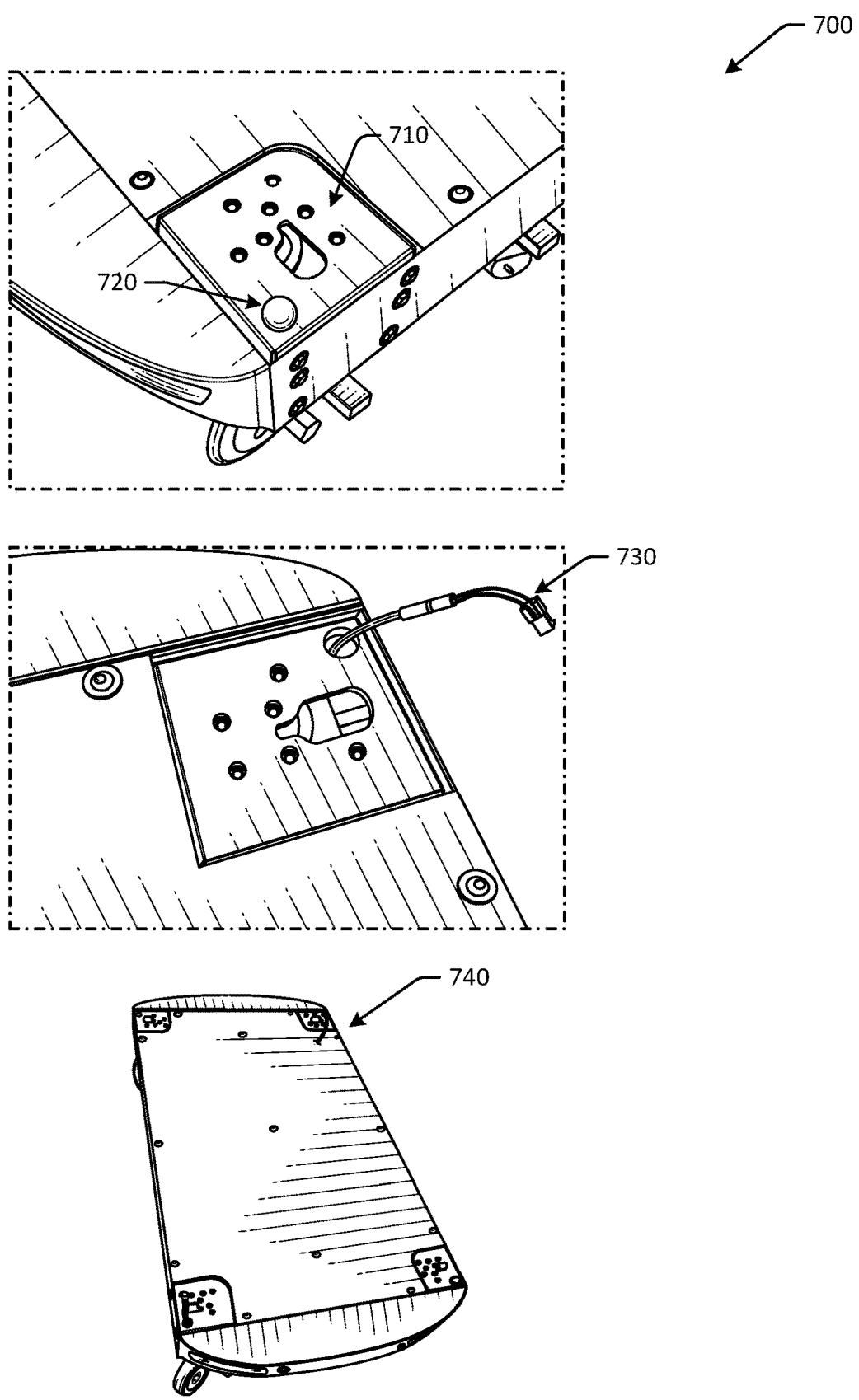
FIG. 7 is a schematic illustration of a universal anchor point for mobile robots with a power cord in accordance with one or more embodiments of the disclosure.

FIG. 7 is a schematic illustration of a universal anchor point for mobile robots with a power cord in various views 700 in accordance with one or more embodiments of the disclosure. Other embodiments may include additional or fewer components. The illustration of FIG. 7 may not be to scale, and may not be illustrated to scale with respect to other figures. The universal anchor point illustrated in FIG. 7 may be the same universal anchor point discussed with respect to FIGS. 1-6.

As illustrated in FIG. 7, in some instances, mobile robots may not have shelving components attached. In the absence of a top shelving unit, users may have the option of whether to keep universal anchor points exposed or hidden from view. Different lids may be used with mobile robots to expose or hide the universal anchor points. For example, in FIG. 7, a lid with corner cutouts 740 may be included, where the entire chassis is covered, but for the universal anchor points 710 disposed in the corners. Other lids may not include cutouts and may therefore hide the universal anchor points 710.

The exposed anchor points 710 may include one or more cord pass through openings 720. A power cord 730 may be routed through the cord pass through opening 720. As illustrated in FIG. 7, the power cord 730 may be exposed, along with the other universal anchor points, while the remainder of the chassis is covered with a lid 740. Power may therefore be supplied to components coupled to the mobile cart. A grommet may be included around a perimeter of the cord pass through opening 720 to protect the power cord 730 from fraying. In other embodiments, the cord pass through opening 720 may be plugged with a rubber component to prevent debris or items from falling through the cord pass through opening 720.

Figure 8:
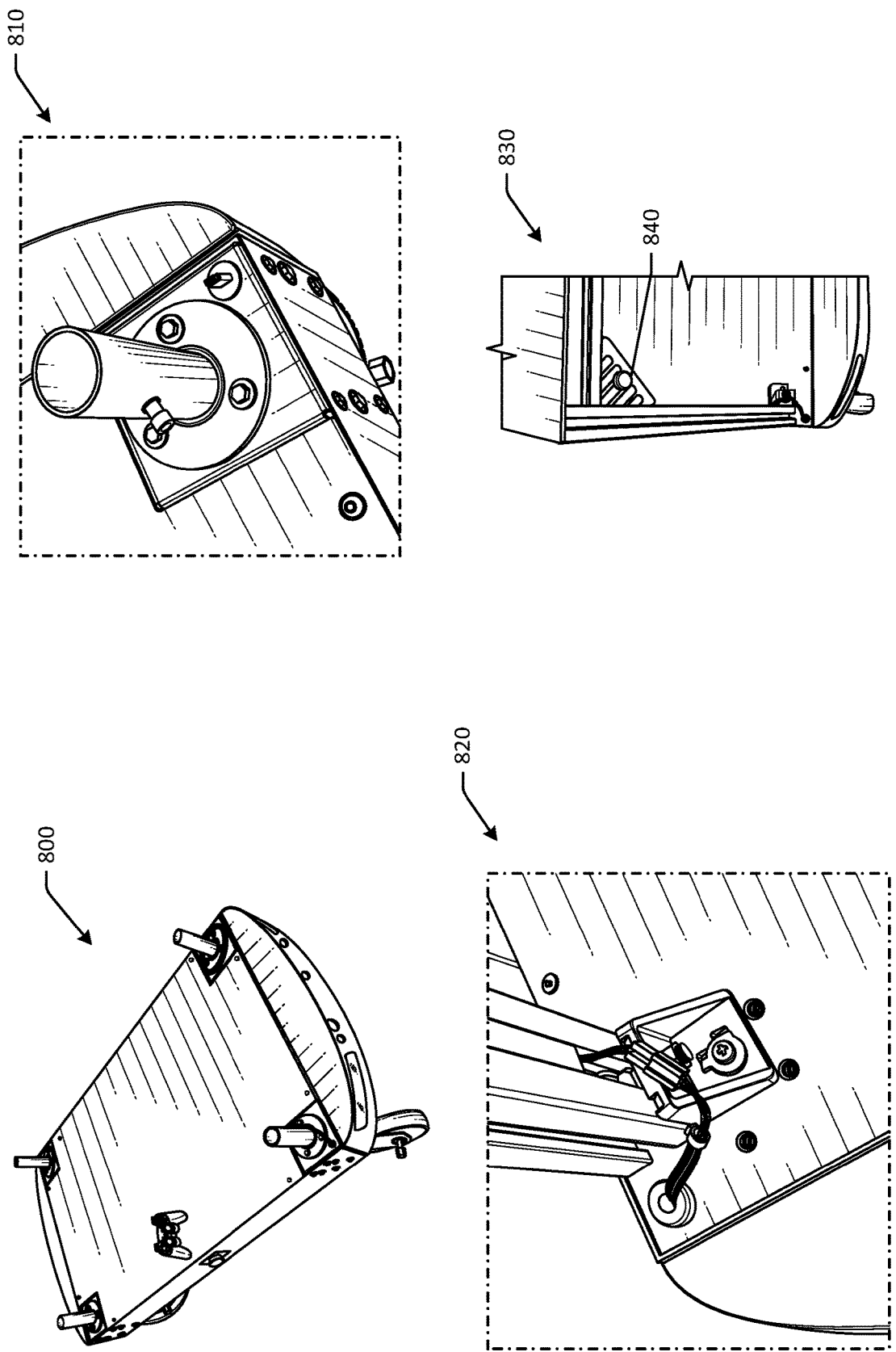
FIG. 8 is a schematic illustration of a universal anchor point for mobile robots with an example attachment configuration in accordance with one or more embodiments of the disclosure.

FIG. 8 is a schematic illustration of a universal anchor point for mobile robots 800 with an example attachment configuration in accordance with one or more embodiments of the disclosure. Other embodiments may include additional or fewer components. The illustration of FIG. 8 may not be to scale, and may not be illustrated to scale with respect to other figures. The universal anchor point illustrated in FIG. 8 may be the same universal anchor point discussed with respect to FIGS. 1-7.

As illustrated in FIG. 8, in some instances, mobile robots 800 may have circular coupling components 810 that are coupled to universal anchor points on the mobile robot 800. The circular coupling components 810 may be used to quickly mount or unmount shelving systems with circular vertical support tubes. In another example, mobile robots 800 may have rectangular coupling components 820 that are coupled to universal anchor points on the mobile robot 800. The rectangular coupling components 820 may be used to quickly mount or unmount shelving systems with rectangular vertical support tubes. Power cords may be passed through vertical support tubes and may be used to power various components, such as a button 840 or other electronic device coupled to a shelving system 330. The power cord or other cable may be covered as illustrated in FIG. 8.

Figure 9:
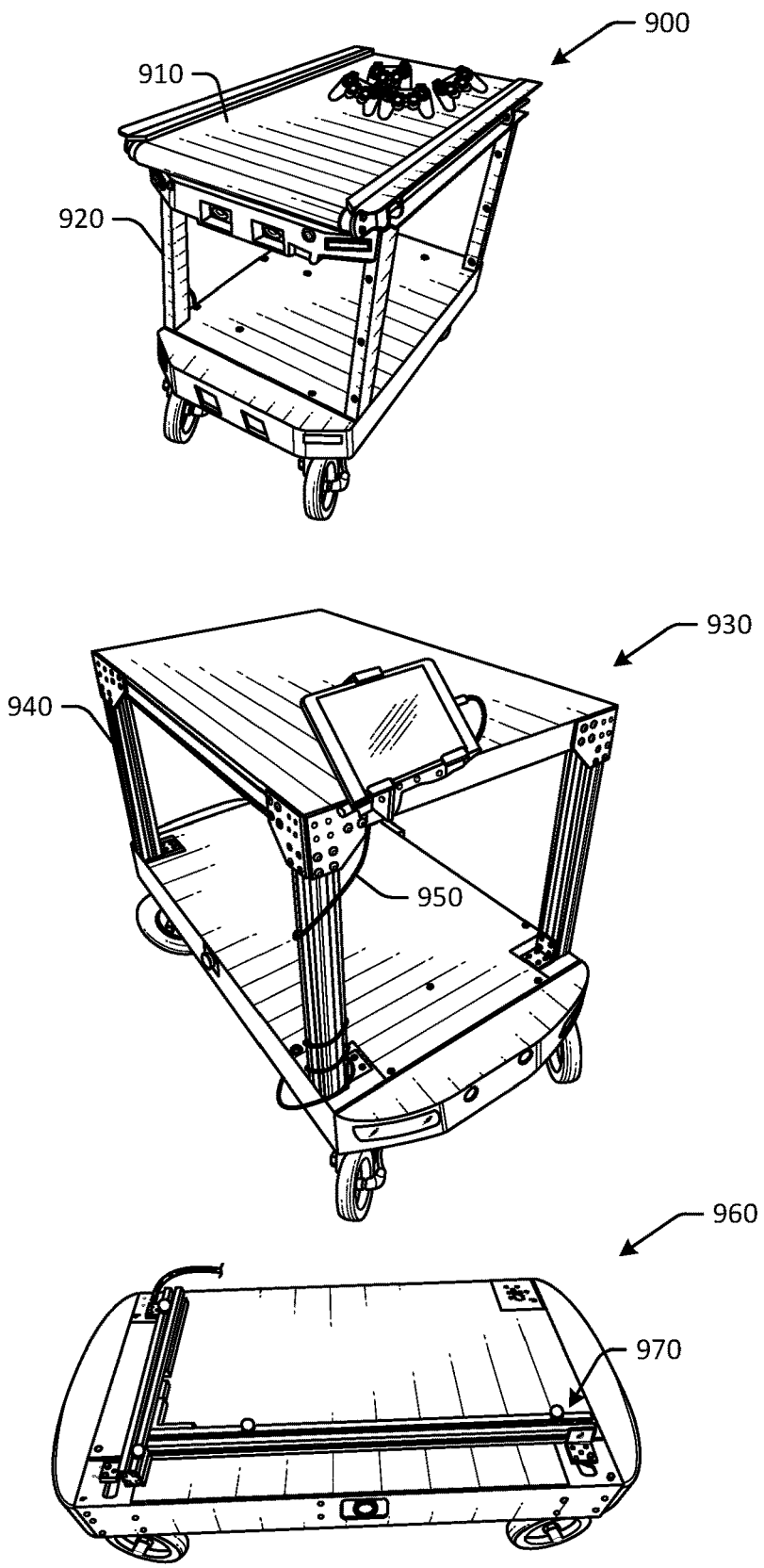
FIG. 9 is a schematic illustration of mobile robots with universal anchor points in accordance with one or more embodiments of the disclosure.

FIG. 9 is a schematic illustration of mobile robots with universal anchor points in accordance with one or more embodiments of the disclosure. Other embodiments may include additional or fewer components. The illustration of FIG. 9 may not be to scale, and may not be illustrated to scale with respect to other figures. The universal anchor point illustrated in FIG. 9 may be the same universal anchor point discussed with respect to FIGS. 1-8.

In FIG. 9, a mobile robot 900 is illustrated with a conveyor belt attachment 910. The conveyor belt attachment 910 may be coupled to the mobile robot 900 with rectangular vertical supports 920. The conveyor belt attachment 910 may be removed as an assembly and easily swapped with a shelving system or other attachment. The conveyor belt attachment 910 may be powered by a battery of the mobile robot 700. The conveyor belt attachment 910 may include a conveyor belt that can be used to move items from one end of the conveyor belt to another end. The mobile robot 900 may therefore be versatile as far as attachment functionality.

In another example, a mobile robot 930 may include a table attachment with a human machine interface device, such as a tablet, that is attached to the table. The table attachment may be coupled to universal anchor points of the mobile robot 930 using rectangular leg supports 940. A power cord 950 may be routed to the human machine interface device. The human machine interface device may be used to input instructions to the mobile robot 930. In other embodiments, the power cord 950 may be routed through one of the vertical supports.

In another example, a mobile robot 960 may include an attachment of rails 970 in various custom positions or arrangements. The rails 970 may be configured to move with respect to each other and/or the mobile robot 960.

Figure 10:
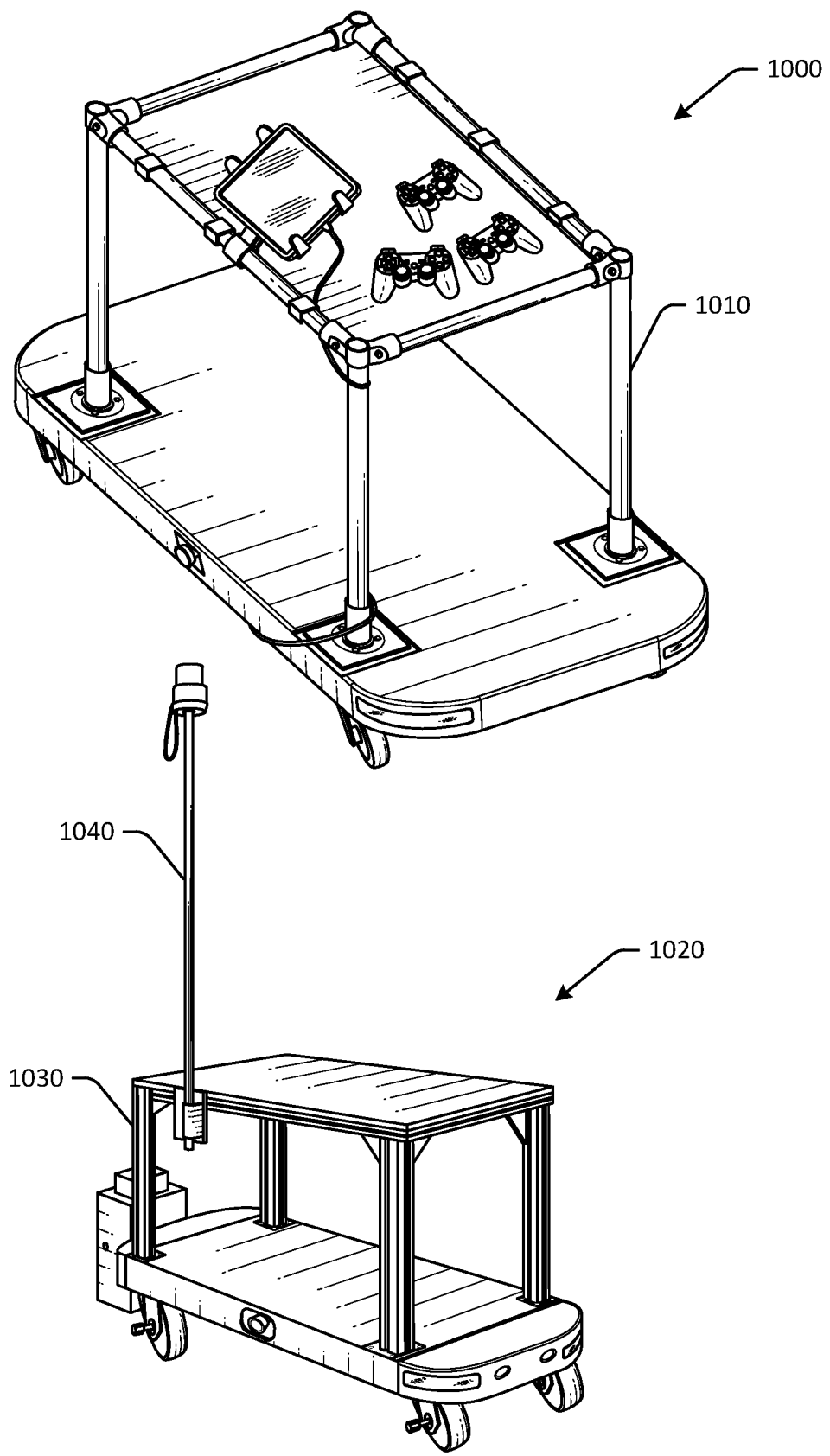
FIG. 10 is a schematic illustration of mobile robots with universal anchor points in accordance with one or more embodiments of the disclosure.

FIG. 10 is a schematic illustration of mobile robots with universal anchor points in accordance with one or more embodiments of the disclosure. Other embodiments may include additional or fewer components. The illustration of FIG. 10 may not be to scale, and may not be illustrated to scale with respect to other figures. The universal anchor point illustrated in FIG. 10 may be the same universal anchor point discussed with respect to FIGS. 1-9.

In FIG. 10, a mobile robot 1000 is illustrated with a flat shelving attachment. The flat shelving attachment may be coupled to the mobile robot 1000 with rectangular circular or tubular supports 1010. The flat shelving attachment may be removed as an assembly and easily swapped with a conveyor belt system or other attachment. The mobile robot 1000 may therefore be versatile as far as attachment functionality.

In another example, a mobile robot 1020 may include a table attachment that may be coupled to universal anchor points of the mobile robot 1020 using rectangular leg supports 1030. A vertical light beacon 1040 may be coupled to the table attachment and may be used to communicate information to users using light indicators. In some embodiments, the vertical light beacon 1040 may be coupled directly to one of the universal anchor points of the mobile robot 1020. In such instances, only one universal anchor point may be needed at the mobile robot 1020, depending on how many vertical light beacons are desired to be coupled to the mobile robot 1020. Because of the rigidity and strength provided by the universal anchor points, the vertical light beacon 1040 may be secured even though the vertical light beacon 1040 may be fairly long and may therefore apply high levels of torque to the joint with the universal anchor point relative to shelving system supports.

One or more operations of the methods, process flows, or use cases of FIGS. 1-10 may have been described above as being performed by a user device, or more specifically, by one or more program module(s), applications, or the like executing on a device. It should be appreciated, however, that any of the operations of the methods, process flows, or use cases of FIGS. 1-10 may be performed, at least in part, in a distributed manner by one or more other devices, or more specifically, by one or more program module(s), applications, or the like executing on such devices. In addition, it should be appreciated that processing performed in response to the execution of computer-executable instructions provided as part of an application, program module, or the like may be interchangeably described herein as being performed by the application or the program module itself or by a device on which the application, program module, or the like is executing. While the operations of the methods, process flows, or use cases of FIGS. 1-10 may be described in the context of the illustrative devices, it should be appreciated that such operations may be implemented in connection with numerous other device configurations.

The operations described and depicted in the illustrative methods, process flows, and use cases of FIGS. 1-10 may be carried out or performed in any suitable order, such as the depicted orders, as desired in various example embodiments of the disclosure. Additionally, in certain example embodiments, at least a portion of the operations may be carried out in parallel. Furthermore, in certain example embodiments, less, more, or different operations than those depicted in FIGS. 1-10 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by the execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Illustrative Computer Architecture

Figure 11:
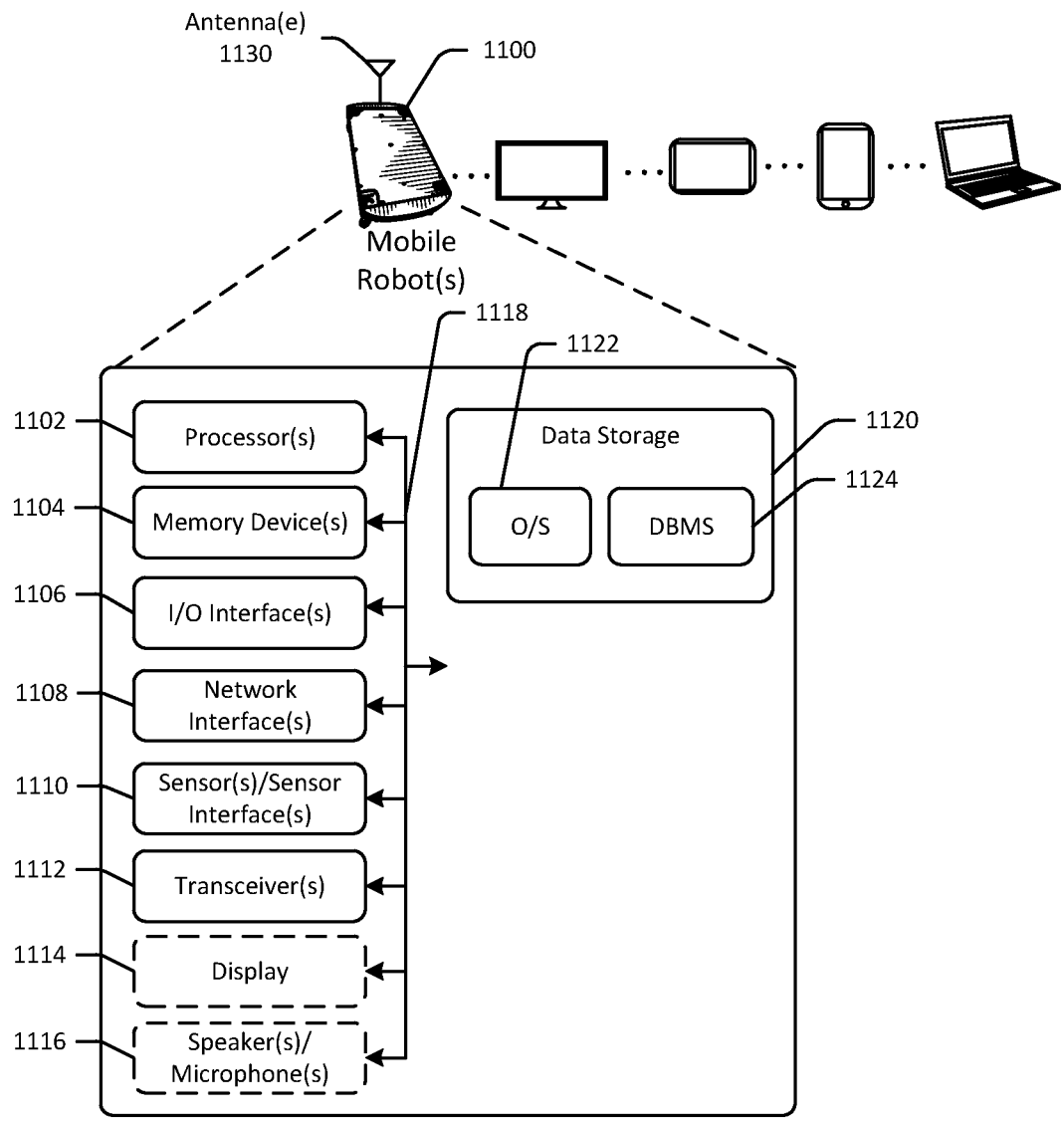
FIG. 11 schematically illustrates an example architecture of a computer system associated with an item sorting system in accordance with one or more embodiments of the disclosure.

FIG. 11 is a schematic block diagram of one or more illustrative mobile robot(s) 1100 in accordance with one or more example embodiments of the disclosure. The mobile robot(s) 1100 may include any suitable computing device including, but not limited to, a server system, a voice interaction device, a mobile device such as a smartphone, a tablet, an e-reader, a wearable device, or the like; a desktop computer; a laptop computer; a content streaming device; or the like. The mobile robot(s) 1100 may correspond to an illustrative device configuration for the device(s) of FIGS. 1-10.

The mobile robot(s) 1100 may be configured to communicate with one or more servers, user devices, or the like. The mobile robot(s) 1100 may be configured to move autonomously in some instances.

The mobile robot(s) 1100 may be configured to communicate via one or more networks. Such network(s) may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the mobile robot(s) 1100 may include one or more processors (processor(s)) 1102, one or more memory devices 1104 (also referred to herein as memory 1104), one or more input/output (I/O) interface(s) 1106, one or more network interface(s) 1108, one or more sensor(s) or sensor interface(s) 1110, one or more transceiver(s) 1112, one or more optional display(s) 1114, one or more optional microphone(s) 1116, and data storage 1120. The mobile robot(s) 1100 may further include one or more bus(es) 1118 that functionally couple various components of the mobile robot(s) 1100. The mobile robot(s) 1100 may further include one or more antenna(e) 1130 that may include, without limitation, a cellular antenna for transmitting or receiving signals to/from a cellular network infrastructure, an antenna for transmitting or receiving Wi-Fi signals to/from an access point (AP), a Global Navigation Satellite System (GNSS) antenna for receiving GNSS signals from a GNSS satellite, a Bluetooth antenna for transmitting or receiving Bluetooth signals, a Near Field Communication (NFC) antenna for transmitting or receiving NFC signals, and so forth. These various components will be described in more detail hereinafter.

The bus(es) 1118 may include at least one of a system bus, a memory bus, an address bus, or a message bus, and may permit the exchange of information (e.g., data (including computer-executable code), signaling, etc.) between various components of the mobile robot(s) 1100. The bus(es) 1118 may include, without limitation, a memory bus or a memory controller, a peripheral bus, an accelerated graphics port, and so forth. The bus(es) 1118 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnect (PCI) architecture, a PCI-Express architecture, a Personal Computer Memory Card International Association (PCMCIA) architecture, a Universal Serial Bus (USB) architecture, and so forth.

The memory 1104 of the mobile robot(s) 1100 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 1104 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 1104 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 1120 may include removable storage and/or non-removable storage including, but not limited to, magnetic storage, optical disk storage, and/or tape storage. The data storage 1120 may provide non-volatile storage of computer-executable instructions and other data. The memory 1104 and the data storage 1120, removable and/or non-removable, are examples of computer-readable storage media (CRSM) as that term is used herein.

The data storage 1120 may store computer-executable code, instructions, or the like that may be loadable into the memory 1104 and executable by the processor(s) 1102 to cause the processor(s) 1102 to perform or initiate various operations. The data storage 1120 may additionally store data that may be copied to the memory 1104 for use by the processor(s) 1102 during the execution of the computer-executable instructions. Moreover, output data generated as a result of execution of the computer-executable instructions by the processor(s) 1102 may be stored initially in the memory 1104, and may ultimately be copied to the data storage 1120 for non-volatile storage.

More specifically, the data storage 1120 may store one or more operating systems (O/S) 1122; one or more database management systems (DBMS) 1124; and one or more program module(s), applications, engines, computer-executable code, scripts, or the like. Some or all of these module(s) may be sub-module(s). Any of the components depicted as being stored in the data storage 1120 may include any combination of software, firmware, and/or hardware. The software and/or firmware may include computer-executable code, instructions, or the like that may be loaded into the memory 1104 for execution by one or more of the processor(s) 1102. Any of the components depicted as being stored in the data storage 1120 may support functionality described in reference to corresponding components named earlier in this disclosure.

The data storage 1120 may further store various types of data utilized by the components of the mobile robot(s) 1100. Any data stored in the data storage 1120 may be loaded into the memory 1104 for use by the processor(s) 1102 in executing computer-executable code. In addition, any data depicted as being stored in the data storage 1120 may potentially be stored in one or more datastore(s) and may be accessed via the DBMS 1124 and loaded in the memory 1104 for use by the processor(s) 1102 in executing computer-executable code. The datastore(s) may include, but are not limited to, databases (e.g., relational, object-oriented, etc.), file systems, flat files, distributed datastores in which data is stored on more than one node of a computer network, peer-to-peer network datastores, or the like.

The processor(s) 1102 may be configured to access the memory 1104 and execute the computer-executable instructions loaded therein. For example, the processor(s) 1102 may be configured to execute the computer-executable instructions of the various program module(s), applications, engines, or the like of the mobile robot(s) 1100 to cause or facilitate various operations to be performed in accordance with one or more embodiments of the disclosure. The processor(s) 1102 may include any suitable processing unit capable of accepting data as input, processing the input data in accordance with stored computer-executable instructions, and generating output data. The processor(s) 1102 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 1102 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 1102 may be capable of supporting any of a variety of instruction sets.

Referring now to other illustrative components depicted as being stored in the data storage 1120, the O/S 1122 may be loaded from the data storage 1120 into the memory 1104 and may provide an interface between other application software executing on the mobile robot(s) 1100 and the hardware resources of the mobile robot(s) 1100. More specifically, the O/S 1122 may include a set of computer-executable instructions for managing the hardware resources of the mobile robot(s) 1100 and for providing common services to other application programs (e.g., managing memory allocation among various application programs). In certain example embodiments, the O/S 1122 may control execution of the other program module(s). The O/S 1122 may include any operating system now known or which may be developed in the future including, but not limited to, any server operating system, any mainframe operating system, or any other proprietary or non-proprietary operating system.

The DBMS 1124 may be loaded into the memory 1104 and may support functionality for accessing, retrieving, storing, and/or manipulating data stored in the memory 1104 and/or data stored in the data storage 1120. The DBMS 1124 may use any of a variety of database models (e.g., relational model, object model, etc.) and may support any of a variety of query languages. The DBMS 1124 may access data represented in one or more data schemas and stored in any suitable data repository including, but not limited to, databases (e.g., relational, object-oriented, etc.), file systems, flat files, distributed datastores in which data is stored on more than one node of a computer network, peer-to-peer network datastores, or the like. In those example embodiments in which the mobile robot(s) 1100 is a mobile device, the DBMS 1124 may be any suitable lightweight DBMS optimized for performance on a mobile device.

Referring now to other illustrative components of the mobile robot(s) 1100, the input/output (I/O) interface(s) 1106 may facilitate the receipt of input information by the mobile robot(s) 1100 from one or more I/O devices as well as the output of information from the mobile robot(s) 1100 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the mobile robot(s) 1100 or may be separate. The I/O devices may further include, for example, any number of peripheral devices such as data storage devices, printing devices, and so forth.

The I/O interface(s) 1106 may also include an interface for an external peripheral device connection such as universal serial bus (USB), FireWire, Thunderbolt, Ethernet port or other connection protocol that may connect to one or more networks. The I/O interface(s) 1106 may also include a connection to one or more of the antenna(e) 1130 to connect to one or more networks via a wireless local area network (WLAN) (such as Wi-Fi) radio, Bluetooth, ZigBee, and/or a wireless network radio, such as a radio capable of communication with a wireless communication network such as a Long Term Evolution (LTE) network, WiMAX network, 3G network, a ZigBee network, etc.

The mobile robot(s) 1100 may further include one or more network interface(s) 1108 via which the mobile robot(s) 1100 may communicate with any of a variety of other systems, platforms, networks, devices, and so forth. The network interface(s) 1108 may enable communication, for example, with one or more wireless routers, one or more host servers, one or more web servers, and the like via one or more networks.

The antenna(e) 1130 may include any suitable type of antenna depending, for example, on the communications protocols used to transmit or receive signals via the antenna(e) 1130. Non-limiting examples of suitable antennae may include directional antennae, non-directional antennae, dipole antennae, folded dipole antennae, patch antennae, multiple-input multiple-output (MIMO) antennae, or the like. The antenna(e) 1130 may be communicatively coupled to one or more transceivers 1112 or radio components to which or from which signals may be transmitted or received.

As previously described, the antenna(e) 1130 may include a cellular antenna configured to transmit or receive signals in accordance with established standards and protocols, such as Global System for Mobile Communications (GSM), 3G standards (e.g., Universal Mobile Telecommunications System (UMTS), Wideband Code Division Multiple Access (W-CDMA), CDMA2000, etc.), 4G standards (e.g., Long-Term Evolution (LTE), WiMax, etc.), direct satellite communications, or the like.

The antenna(e) 1130 may additionally, or alternatively, include a Wi-Fi antenna configured to transmit or receive signals in accordance with established standards and protocols, such as the IEEE 802.11 family of standards, including via 2.4 GHz channels (e.g., 802.11b, 802.11g, 802.11n), 5 GHz channels (e.g., 802.11n, 802.11ac), or 60 GHz channels (e.g., 802.11ad). In alternative example embodiments, the antenna(e) 1130 may be configured to transmit or receive radio frequency signals within any suitable frequency range forming part of the unlicensed portion of the radio spectrum.

The antenna(e) 1130 may additionally, or alternatively, include a GNSS antenna configured to receive GNSS signals from three or more GNSS satellites carrying time-position information to triangulate a position therefrom. Such a GNSS antenna may be configured to receive GNSS signals from any current or planned GNSS such as, for example, the Global Positioning System (GPS), the GLONASS System, the Compass Navigation System, the Galileo System, or the Indian Regional Navigational System.

The transceiver(s) 1112 may include any suitable radio component(s) for—in cooperation with the antenna(e) 1130—transmitting or receiving radio frequency (RF) signals in the bandwidth and/or channels corresponding to the communications protocols utilized by the mobile robot(s) 1100 to communicate with other devices. The transceiver(s) 1112 may include hardware, software, and/or firmware for modulating, transmitting, or receiving—potentially in cooperation with any of antenna(e) 1130—communications signals according to any of the communications protocols discussed above including, but not limited to, one or more Wi-Fi and/or Wi-Fi direct protocols, as standardized by the IEEE 802.11 standards, one or more non-Wi-Fi protocols, or one or more cellular communications protocols or standards. The transceiver(s) 1112 may further include hardware, firmware, or software for receiving GNSS signals. The transceiver(s) 1112 may include any known receiver and baseband suitable for communicating via the communications protocols utilized by the mobile robot(s) 1100. The transceiver(s) 1112 may further include a low noise amplifier (LNA), additional signal amplifiers, an analog-to-digital (A/D) converter, one or more buffers, a digital baseband, or the like.

The sensor(s)/sensor interface(s) 1110 may include or may be capable of interfacing with any suitable type of sensing device such as, for example, inertial sensors, force sensors, thermal sensors, photocells, and so forth. Example types of inertial sensors may include accelerometers (e.g., MEMS-based accelerometers), gyroscopes, and so forth.

The optional display(s) 1114 may be configured to output light and/or render content. The optional speaker(s)/microphone(s) 1116 may be any device configured to receive analog sound input or voice data.

It should be appreciated that the program module(s), applications, computer-executable instructions, code, or the like depicted in FIG. 11 as being stored in the data storage 1120 are merely illustrative and not exhaustive and that processing described as being supported by any particular module may alternatively be distributed across multiple module(s) or performed by a different module. In addition, various program module(s), script(s), plug-in(s), Application Programming Interface(s) (API(s)), or any other suitable computer-executable code hosted locally on the mobile robot(s) 1100, and/or hosted on other computing device(s) accessible via one or more networks, may be provided to support functionality provided by the program module(s), applications, or computer-executable code depicted in FIG. 11 and/or additional or alternate functionality. Further, functionality may be modularized differently such that processing described as being supported collectively by the collection of program module(s) depicted in FIG. 11 may be performed by a fewer or greater number of module(s), or functionality described as being supported by any particular module may be supported, at least in part, by another module. In addition, program module(s) that support the functionality described herein may form part of one or more applications executable across any number of systems or devices in accordance with any suitable computing model such as, for example, a client-server model, a peer-to-peer model, and so forth. In addition, any of the functionality described as being supported by any of the program module(s) depicted in FIG. 11 may be implemented, at least partially, in hardware and/or firmware across any number of devices.

It should further be appreciated that the mobile robot(s) 1100 may include alternate and/or additional hardware, software, or firmware components beyond those described or depicted without departing from the scope of the disclosure. More particularly, it should be appreciated that software, firmware, or hardware components depicted as forming part of the mobile robot(s) 1100 are merely illustrative and that some components may not be present or additional components may be provided in various embodiments. While various illustrative program module(s) have been depicted and described as software module(s) stored in the data storage 1120, it should be appreciated that functionality described as being supported by the program module(s) may be enabled by any combination of hardware, software, and/or firmware. It should further be appreciated that each of the above-mentioned module(s) may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other module(s). Further, one or more depicted module(s) may not be present in certain embodiments, while in other embodiments, additional module(s) not depicted may be present and may support at least a portion of the described functionality and/or additional functionality. Moreover, while certain module(s) may be depicted and described as sub-module(s) of another module, in certain embodiments, such module(s) may be provided as independent module(s) or as sub-module(s) of other module(s).

One or more operations of the methods, process flows, and use cases of FIGS. 1-10 may be performed by a device having the illustrative configuration depicted in FIG. 11, or more specifically, by one or more engines, program module(s), applications, or the like executable on such a device. It should be appreciated, however, that such operations may be implemented in connection with numerous other device configurations.

The operations described and depicted in the illustrative methods and process flows of any of FIGS. 1-10 may be carried out or performed in any suitable order as desired in various example embodiments of the disclosure. Additionally, in certain example embodiments, at least a portion of the operations may be carried out in parallel. Furthermore, in certain example embodiments, less, more, or different operations than those depicted in FIGS. 1-10 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed is:

1. An autonomous cart comprising:
    a chassis;
    a removable shelving assembly comprising a support member;
    a first anchor plate coupled to the chassis, the first anchor plate configured to anchor the support member to the chassis, wherein the first anchor plate comprises:
        a first set of holes forming a triangular pattern, the first set of holes comprising a first hole; and
        a second set of holes forming a rectangular pattern, wherein the second set of holes comprises the first hole;
    wherein the first anchor plate is positioned at a first corner of the chassis and is configured to be coupled to support members of different diameters or widths;
    a second anchor plate positioned at a second corner of the chassis;
    a third anchor plate positioned at a third corner of the chassis; and
    a fourth anchor plate positioned at a fourth corner of the chassis.

2. The autonomous cart of claim 1, wherein the removable shelving assembly can be removed from the chassis as an assembly.

3. The autonomous cart of claim 1, wherein the first anchor plate further comprises:
    a first flange having a first height, wherein the first flange is secured to the chassis;
    a second flange having a second height that is less than the first height;
    a third flange having the second height; and
    a fourth flange having a third height that is less than the second height.

4. A mobile robot comprising:
    a chassis;
    a removable assembly comprising a support member;
    a first anchor point coupled to the chassis, the first anchor point configured to anchor the support member to the chassis, wherein the first anchor point is disposed at a first corner of the chassis; and
    a second anchor point disposed at a second corner of the chassis;
    wherein the first anchor point is configured to be coupled to support members of different diameters or widths.

5. The mobile robot of claim 4, wherein the removable assembly further comprises either a shelving assembly, a robotic arm assembly, or a conveyor belt assembly.

6. The mobile robot of claim 4, further comprising:
    a third anchor point disposed along a side of the chassis between the first anchor point and the second anchor point.

7. The mobile robot of claim 4, wherein the first anchor point comprises:
    a first set of holes forming a triangular pattern, the first set of holes comprising a first hole; and
    a second set of holes forming a rectangular pattern, wherein the second set of holes comprises the first hole.

8. The mobile robot of claim 4, wherein the first anchor point comprises:
    a first flange having a first height, wherein the first flange is secured to the chassis.

9. The mobile robot of claim 8, wherein the first anchor point further comprises:
    a second flange having a second height that is less than the first height;
    a third flange having the second height; and
    a fourth flange having a third height that is less than the second height.

10. The mobile robot of claim 9, wherein the second flange and the third flange comprise cutout portions along respective edges of the second flange and third flange.

11. The mobile robot of claim 4, wherein the support member comprises a 1-inch structural tube, a 2-inch structural tube, or a 2-inch extruded aluminum tube.

12. The mobile robot of claim 4, further comprising:
    a battery disposed in a cavity formed by the chassis; and
    a cable extending from the battery through an aperture in the first anchor point.

13. The mobile robot of claim 12, further comprising:
    a lid covering the cavity, the lid having a cutout to expose the first anchor point.

14. An autonomous cart comprising:
    a chassis;
    a battery disposed in a cavity formed by the chassis;
    at least one anchor plate coupled to the chassis and configured to anchor a detachable shelf attachment to the chassis; and
    a lid covering the cavity, the lid having a cutout to expose the at least one anchor plate.

15. The autonomous cart of claim 14, wherein the detachable shelf attachment can be exchanged with a removable conveyor belt attachment or a robotic arm attachment.

16. The autonomous cart of claim 14, wherein the at least one anchor plate comprises:
    a first set of holes forming a triangular pattern, the first set of holes comprising a first hole; and
    a second set of holes forming a rectangular pattern, wherein the second set of holes comprises the first hole.

17. The autonomous cart of claim 14, wherein the at least one anchor plate comprises:
    a first flange having a first height, wherein the first flange is secured to the chassis;
    a second flange having a second height that is less than the first height;
    a third flange having the second height; and a fourth flange having a third height that is less than the second height.

18. The autonomous cart of claim 14, further comprising:
a cable extending from the battery through an aperture in the at least one anchor plate.

19. The autonomous cart of claim 17, wherein the second flange and the third flange comprise cutout portions along respective edges of the second flange and third flange.

20. The autonomous cart of claim 14, wherein the at least one anchor plate comprises:
a first flange having a first height, wherein the first flange is secured to the chassis.

* * * * *